No. 893,923. PATENTED JULY 21, 1908.
A. HINZKE.
ACID RESISTING COMPOSITION.
APPLICATION FILED JULY 26, 1907.

UNITED STATES PATENT OFFICE.

ALBERT HINZKE, OF MUNISING, MICHIGAN, ASSIGNOR OF ONE-HALF TO HERBERT H. EVERARD, OF KALAMAZOO, MICHIGAN.

ACID-RESISTING COMPOSITION.

No. 893,923.    Specification of Letters Patent.    Patented July 21, 1908.

Application filed July 26, 1907. Serial No. 385,738.

*To all whom it may concern:*

Be it known that I, ALBERT HINZKE, a citizen of the United States, residing at the city of Munising, county of Alger, State of Michigan, have invented certain new and useful Improvements in Acid-Resisting Compositions, of which the following is a specification.

This invention relates to improvements in acid-resisting compositions.

My improved acid-resisting or acid-proof composition is particularly designed by me for use in lining boilers, commonly called "digesters", used in connection with the manufacture of paper pulp or paper stock, tanks and other receptacles and conduits for storing, boiling, or conveying corrosive liquids, although it is desirable and applicable for use in a great variety of relations.

The main objects of this invention are to provide an improved acid-resisting composition which has great adhesive power, is unaffected by heat, sets rapidly, and acquires an extraordinary degree of hardness.

Further objects will definitely appear from the detailed description to follow.

My invention is clearly defined and pointed out in the claims.

I have shown in the accompanying drawing my improved composition used as a mortar in connection with acid-resisting bricks, to illustrate its general application.

Figure 2:
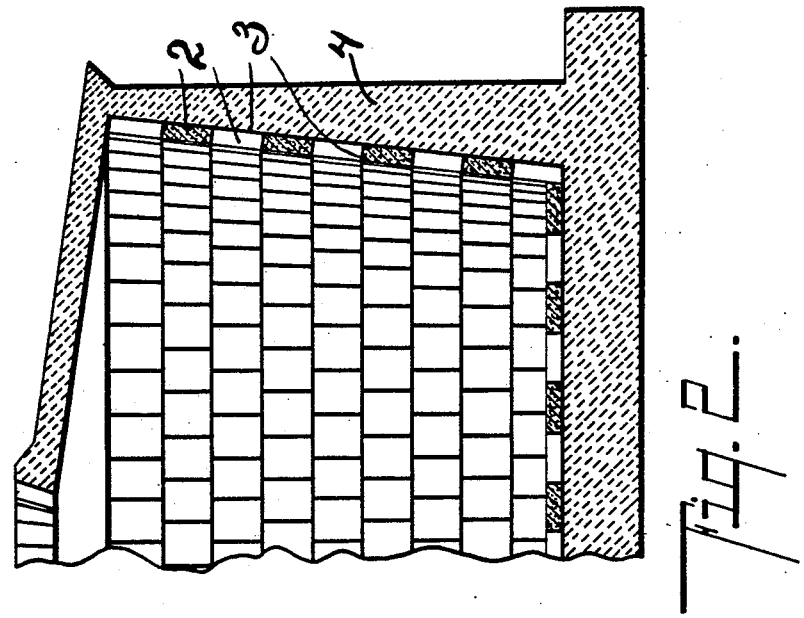
Figure 1:
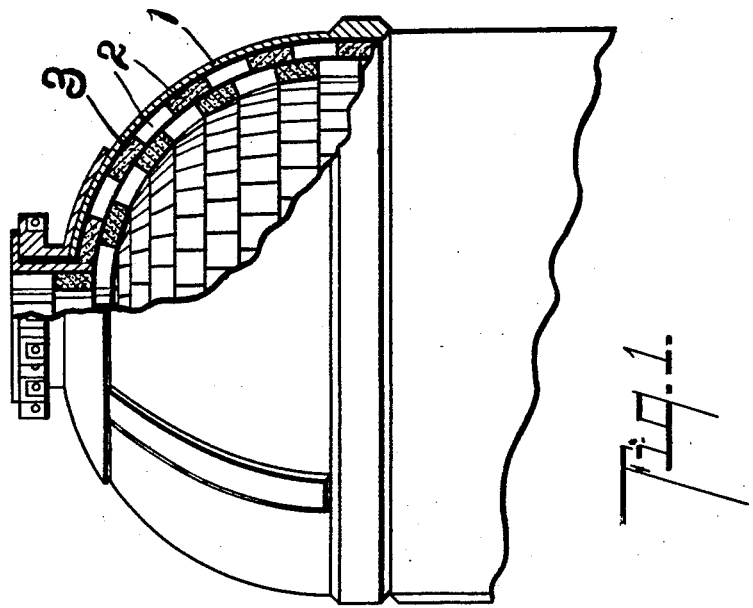

In the accompanying drawing, Figure 1 is a detail view of a "digester", it being shown partially in section to show structural details thereof. Fig. 2 is a detail vertical section of a cement tank having a lining, in which my improved composition is used as a mortar.

In the preparation of my improved composition, I employ the following ingredients: soluble silicate of soda; concentrated glycerin; oxid of lead; and finely crushed cinders. These ingredients I preferably combine in the following proportions and manner: I first mix about six parts of the soluble silicate of soda at about 40 degrees Baumé with one part of concentrated glycerin, at about 30 degrees Baumé, these ingredients being well stirred together until thoroughly incorporated. Of this mixture I take two parts, oxid of lead 1 part, and finely crushed cinders 3 parts, the ingredients being thoroughly mixed to a pasty or mortar-like consistency, in which condition the material should be applied. This I preferably apply as a mortar, the bricks being heated when laid. I preferably employ coal cinders entirely free from wood ashes, although other suitable filler material might be substituted therefor.

In the structure shown in Fig. 1 of the drawing, 1 represents the metal shell of a "digester", 2 the acid-resisting bricks, and 3 the mortar, a thin layer of which is placed over the interior of the shell and between the bricks.

My improved composition soon sets or hardens, and has a great adhesive power. After the lining has been placed in the "digester" or other vessel, before the acid material is placed therein, it should first be slowly heated, whereby the mortar is vitrified and unites the bricks and the iron or steel shell or other wall throughout.

In Fig. 2 of the drawing, I illustrate a cement tank with my improved composition used as a mortar for the brick lining. It will be understood that the drawings are submitted mainly to show an application of my improved composition of matter.

My improved acid-proof composition is, as stated, of very great adhesive power and is not injured by heat. It sets rapidly and becomes very hard. It is, as will be obvious, easily compounded, and can be handled for use like mortar or cement compositions.

While I prefer to use the materials in the proportions I have stated, I am aware that they can be very considerably varied and desirable results still be secured without departing from my invention.

Having thus described my invention, what I claim as new and desire to secure by Letters Patent is:

1. A composition of matter, consisting of silicate of soda; glycerin; oxid of lead; and finely crushed cinders, combined in about the proportions stated into a homogeneous mixture.

2. A composition of matter, consisting of silicate of soda; glycerin; oxid of lead; and finely crushed cinders, combined in about the proportions stated into a homogeneous mixture, vitrified by the application of heat.

3. A composition of matter, consisting of silicate of soda; glycerin; oxid of lead; and a filler material combined into a homogeneous mixture of a mortar-like consistency.

4. A composition of matter, consisting of silicate of soda; glycerin; oxid of lead; and a filler material combined into a homogeneous mixture, vitrified by the application of heat.

In witness whereof, I have hereunto set my hand and seal in the presence of two witnesses.

ALBERT HINZKE. [L. S.]

Witnesses:
D. C. EVEREST,
G. A. BALDWIN.